United States Patent [19]

Safinya et al.

[11] Patent Number: 5,406,206
[45] Date of Patent: Apr. 11, 1995

[54] METHOD OF EVALUATING A GEOLOGICAL FORMATION USING A LOGGING TOOL INCLUDING SLOT ANTENNA HAVING TWO NONPARALLEL ELEMENTS

[75] Inventors: Kambiz A. Safinya, Garches, France; Tarek M. Habashy, Danbury; Jeffrey A. Beren, Westport, both of Conn.

[73] Assignee: Schlumberger Technology Corporation, New York, N.Y.

[21] Appl. No.: 98,018

[22] Filed: Jul. 27, 1993

Related U.S. Application Data

[60] Division of Ser. No. 916, Jan. 6, 1993, Pat. No. 5,243,290, which is a continuation of Ser. No. 706,454, May 28, 1991, abandoned.

[51] Int. Cl.⁶ .............................................. G01V 3/30
[52] U.S. Cl. .................................. 324/338; 324/335; 324/343
[58] Field of Search ............... 324/332, 333, 335, 338, 324/339, 341, 343

[56] References Cited

U.S. PATENT DOCUMENTS

| | | | |
|---|---|---|---|
| 2,790,138 | 4/1957 | Poupon | 324/339 |
| 4,360,777 | 11/1982 | Segesman | 324/343 X |
| 4,451,789 | 5/1984 | Meador | 324/335 |
| 4,636,731 | 1/1987 | Savage et al. | 324/343 X |
| 4,704,581 | 11/1987 | Clark | 324/341 |
| 5,066,916 | 11/1991 | Rau | 324/338 |

FOREIGN PATENT DOCUMENTS 648928  2/1979  U.S.S.R. ......................... 324/343

Primary Examiner—Gerard R. Strecker
Attorney, Agent, or Firm—Leonard W. Pojunas

[57] ABSTRACT

A slot antenna has a square aperture and two current probes at angles to each other in the aperture. The two current probes are excited simultaneously or separately with different signals. By adjusting the amplitude or phase of the signals in the current probes, the angle of the magnetic moment of the antenna can be adjusted. An array of such antennas in an electromagnetic propagation tool for a well-logging device simultaneously provides better standoff performance by adjusting tile magnetic moment to be parallel to a borehole axis, and better image response by adjusting the magnetic moment to be perpendicular to the formation bed. The array can be excited to function as an endfire and broadside array of an electromagnetic propagation tool.

16 Claims, 22 Drawing Sheets

METHOD OF EVALUATING A GEOLOGICAL FORMATION USING A LOGGING TOOL INCLUDING SLOT ANTENNA HAVING TWO NONPARALLEL ELEMENTS

This is a divisional of U.S. application Ser. No. 8/000,916, filed Jan. 6, 1993, now U.S. Pat. No. 5,243,290, which is a file wrapper continuation of U.S. application Ser. No. 7/706,454, filed May 28, 1991, now abandoned.

FIELD OF THE INVENTION

The invention concerns an antenna having an adjustable magnetic moment. More specifically, the invention concerns a slot antenna having two non-parallel elements which are energized to produce an adjustable magnetic moment within the plane of the antenna aperture.

BACKGROUND OF THE INVENTION

The measurement of the dielectric constant of a formation surrounding a borehole can be used to determine water saturation, for example, if the lithology and porosity of that formation have been determined. One logging device for measuring the dielectric constant of a formation is the electromagnetic propagation tool (EPT, a mark of Schlumberger). The EPT measures the propagation time and attenuation of an electromagnetic wave that has been propagated through the formation near the borehole. The EPT has been described in U.S. Pat No. 3,944,910, for example. This patent has been assigned to the same assignee as the present invention, and the disclosure of this patent is incorporated by reference.

The EPT has an antenna pad that is rigidly attached to the body of the tool. A back-up arm opens from the tool and forces the antenna pad against the borehole wall. The back-up arm also provides a caliper measurement of the borehole wall. The antenna pad includes two microwave transmitters and two receivers which are mounted in a borehole-compensated array. This arrangement minimizes the effects of borehole rugosity and tool tilt.

U.S. Pat. No. 3,944,910 describes such transmitters and receivers, which comprise cavity-backed slot antennas. Each cavity-backed slot antenna is filled with a dielectric material and includes a probe. The probe extends across the cavity-backed antenna parallel to tile longitudinal axis of tile logging device.

An adaptable EPT (ADEPT) provides superior measurement of the dielectric constant in rugose boreholes and in tile presence of mudcake. The ADEPT uses one of two optional antenna arrays known as the endfire array or tile broadside array. The two antenna arrays are mounted separately on exchangeable antenna pads. The ADEPT can be configured according to expected logging by a quick change of antenna pads. In fact, if saltier muds or formation waters are unexpectedly encountered during a logging pass of the ADEPT using the endfire array, tile antenna pads can be changed on-site, and a repeat pass can be made using the broadside array. Neither antenna array produces an electronically adjustable magnetic moment.

FIG. 1a is a schematic diagram of an ADEPT having a pad that carries an endfire array 10. Two microwave receivers 12 are located between two microwave transmitters 14 with a spacing of 80 mm and 120 min. The two receivers 12 and the two transmitters 14 are oriented vertically on the ADEPT, parallel to the longitudinal axis of the ADEPT and the borehole. Each receiver 12 and transmitter 14 comprises a rectangular slot antenna 16 having one probe element 18 perpendicular to the ADEPT and borehole axis. The endfire array 10 is less affected by hole roughness and tool standoff from mudcake than a conventional logging antenna system. The endfire array 10 has a good depth of investigation without sacrificing vertical resolution. The endfire array 10 is normally used when invaded zone resistivity is greater than 1 ohm-m.

FIG. 1B is a schematic diagram of an ADEPT having a pad that carries a broadside array 20. Two microwave receivers 22 are located between two microwave transmitters 24 with a spacing of 40 mm and 80 mm. The two receivers 22 and the two transmitters 24 are oriented horizontally on the ADEPT, perpendicular to the longitudinal axis of the ADEPT and the borehole. Each receiver 22 and transmitter 24 comprises a rectangular slot antenna 26 having one probe element 28 parallel to the ADEPT and borehole axis. The short spacing between the receivers 22 and the transmitters 24 extends the effective operating range in high porosity or saline conditions, which increase attenuation of signals between such receivers and transmitters. The broadside array 20 has less depth of investigation than the endfire array 20, but has a sharper image response. The broadside array 20 is normally used in the ADEPT when invaded zone resistivity is less than 1 ohm/m.

FIGS. 2a and 2b illustrate the simulated standoff response of the endfire array 10 of FIG. 1a and the broadside array 20 of FIG. 1B at 1.1 GHz. For FIGS. 2a and 2b, formation conductivity is 0.9 S/m and formation permittivity is 22. Standoff layer conductivity is 4.0 S/m and standoff layer permittivity is 73. FIG. 2a illustrates inverted permittivity as a function of standoff of the array, endfire or broadside, from the borehole wall in inches. FIG. 2b illustrates inverted conductivity in mho/m as a function of standoff in inches. The endfire array of FIG. 1a has better standoff performance than the broadside array. In FIGS. 2a and 2b, a solid, horizontal line indicates ideal standoff response. FIGS. 2a and 2b show that the standoff response of the endfire array is more nearly horizontal, and thus more closely approximates the ideal case than the standoff response of the broadside array. Standoff performance of the endfire array is typically good for standoff distances to 0.25".

U.S. Pat. No. 4,704,581, also assigned to the same assignee as this invention and incorporated by reference, describes a logging device having transmitters and receivers that comprise slot antennas. Each slot antenna includes a probe that extends across the cavity-backed antenna parallel to the longitudinal axis of the logging device in one embodiment, or extends across the cavity-backed antenna perpendicular to the longitudinal axis of the logging device in another embodiment.

None of the above devices concerns a slot antenna having two elements which are energized to produce an electronically adjustable angle of magnetic moment.

SUMMARY OF THE INVENTION

The invention concerns a slot antenna comprising an aperture and two non-parallel elements within the aperture. Each element is adapted to receive a corresponding current such that the slot antenna produces a magnetic moment having an orientation that depends on the two corresponding currents. In a specific embodiment, the magnetic moment of the antenna is adjustable within the plane of the aperture by adjusting the magnitude and/or phase of the currents of the elements, and includes the case in which the current of one element is zero. This adjustment of the antenna's magnetic moment can be achieved with either hardware or software, the latter approach being the more flexible, allowing a much wider range of selectable magnetic moments to be achieved.

OBJECTS OF THE INVENTION

An object of the invention is to provide an antenna which has a selectable magnetic moment.

Another object of the invention is to provide an antenna that can alternately generate substantially perpendicular magnetic fields.

Another object of the invention is to provide an array of antennas in an electromagnetic propagation tool, the magnetic moments of which are capable of being electronically adjusted. The electromagnetic propagation tool functions as both an endfire array having better standoff performance and a broadside array having a sharper image response without reconfiguring the tool.

DETAILED DESCRIPTION OF THE INVENTION

Figure 1B:
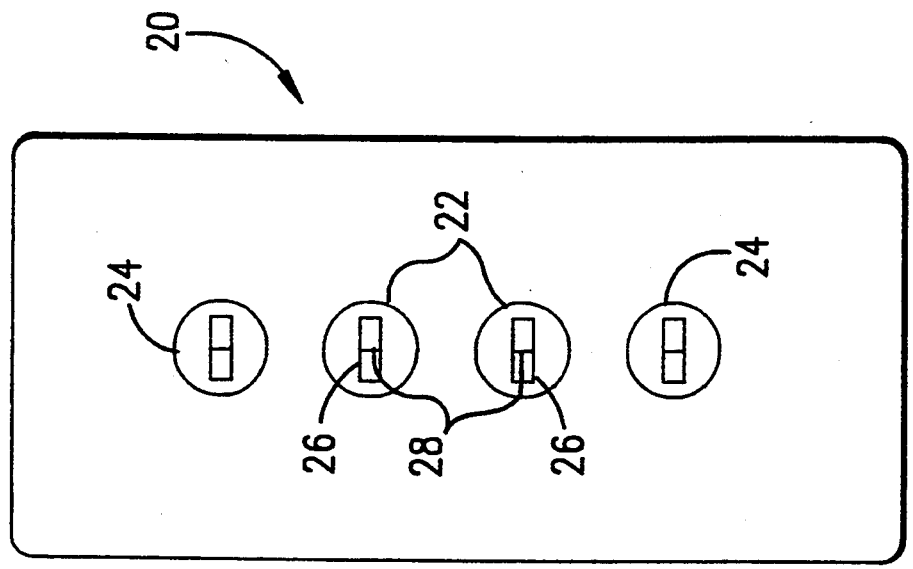
FIGS. 1a and 1b are schematic diagrams of a logging tool having an endfire array of antennas and a broadside array of antennas, respectively.
Figure 1A:
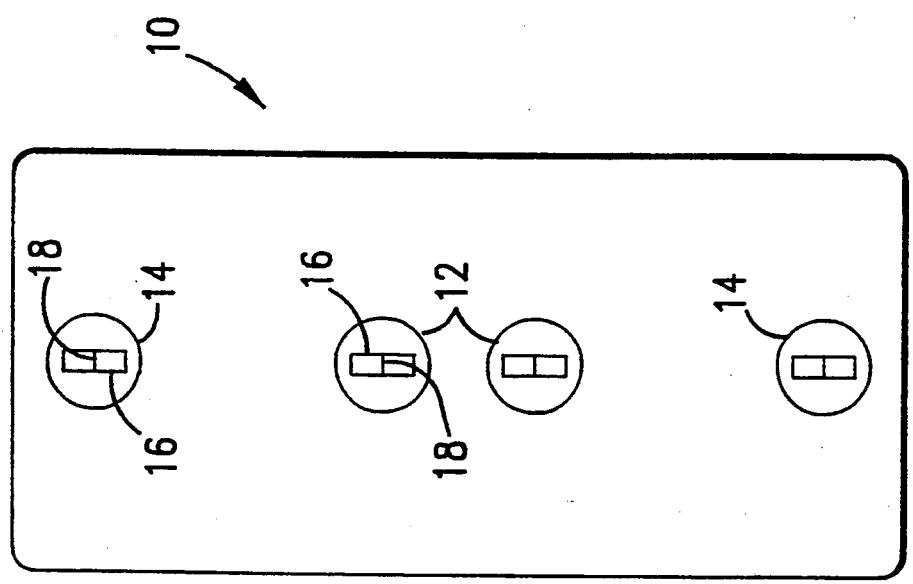
Figure 2A:
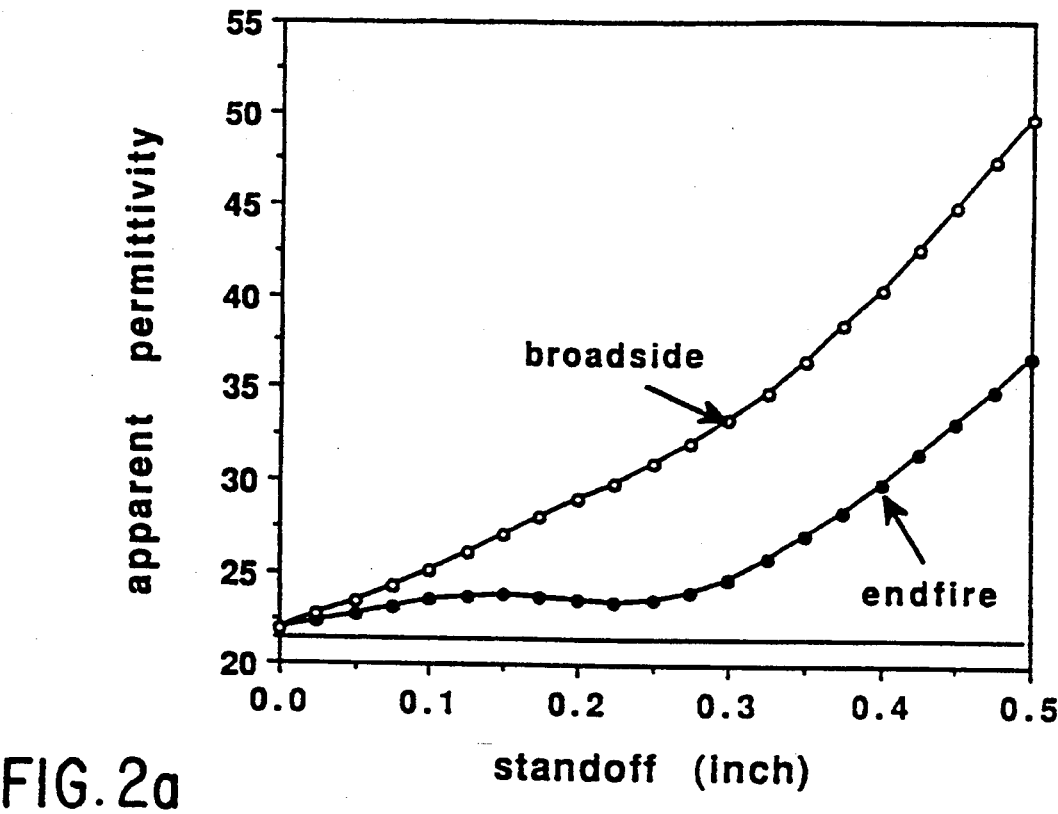
FIGS. 2a and 2b illustrate the standoff response of the endfire array and the broadside array.
Figure 2B:
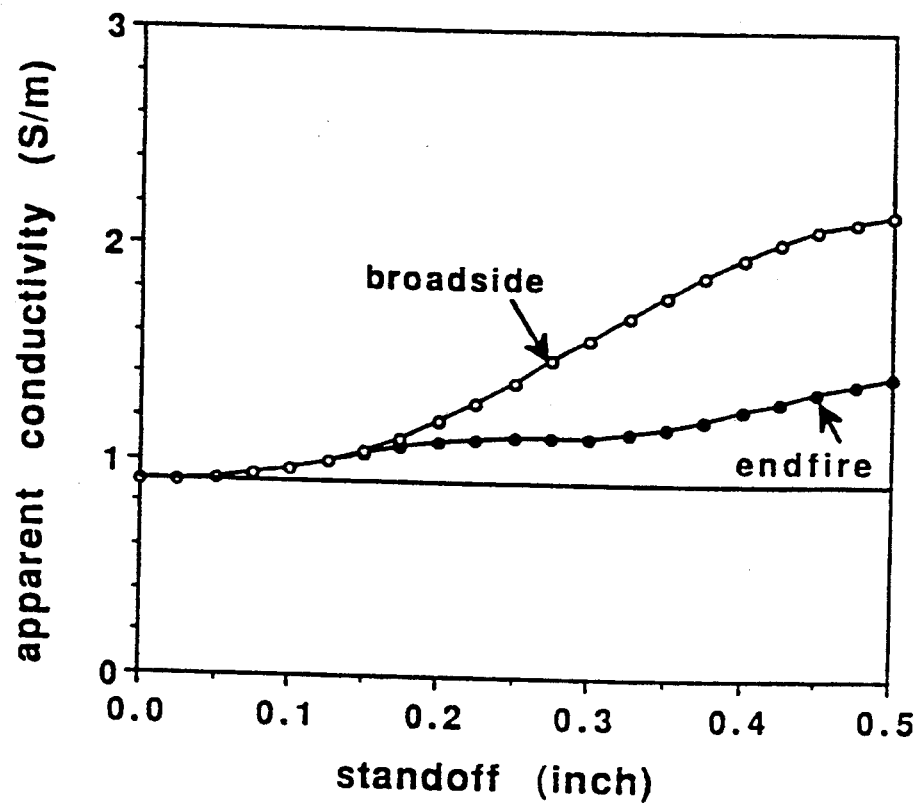
Figure 3:
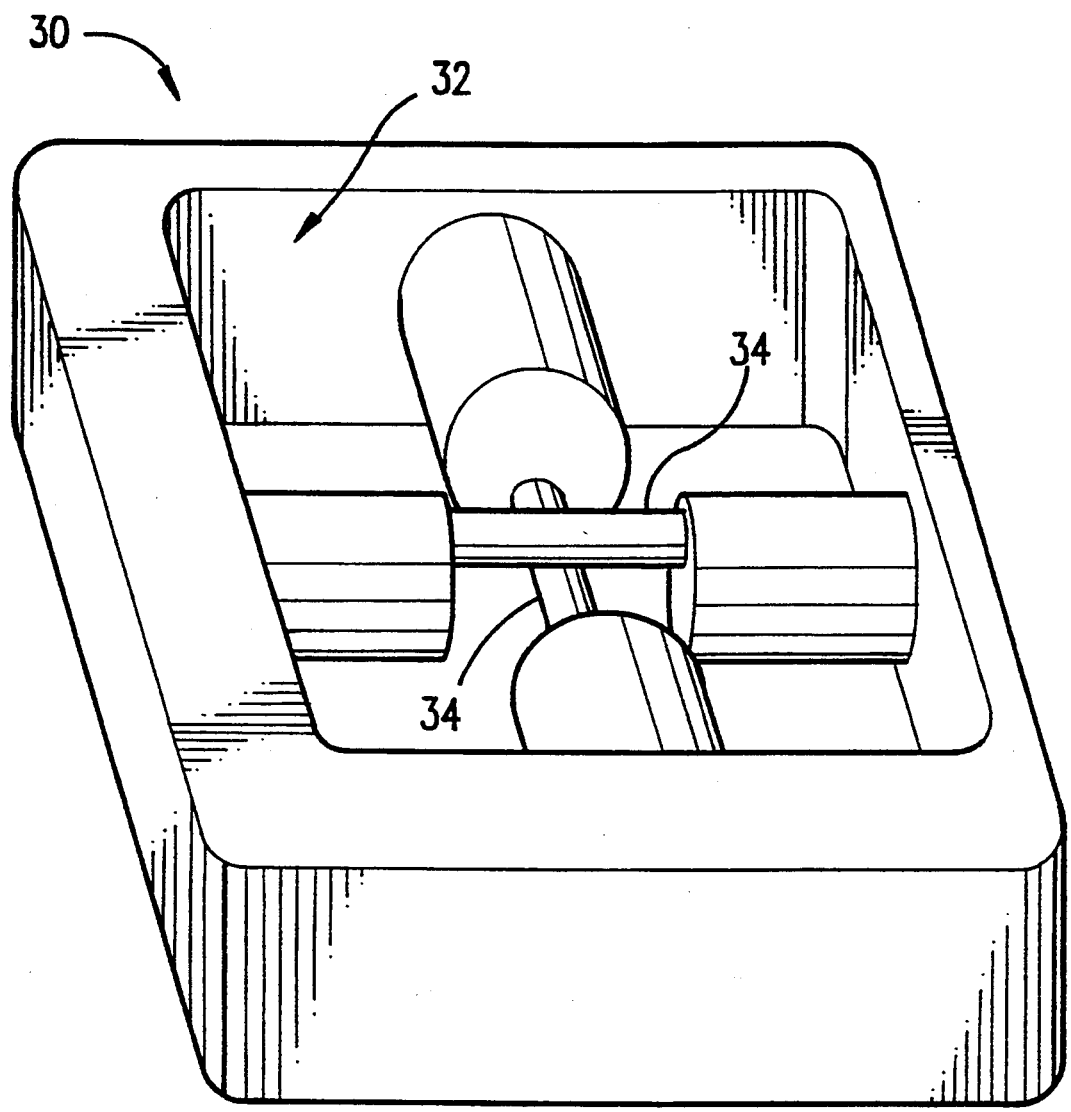
FIG. 3 is a perspective view of a cross-dipole slot antenna according to this invention.

FIG. 3 shows a perspective view of a cross-dipole antenna 30 according to this invention. The antenna 30 is a slot antenna having a square aperture 32. In the preferred embodiment, the antenna 30 operates in the range of 200 to 2000 MHz and the antenna aperture is 0.334" on each side. The antenna 30 has two perpendicular probe elements 34 which are centered in the aperture. Each probe element 34 is 0.063" diameter at its opposite ends. The center of each probe is narrowed so the probes do not contact one another. Antennas of other dimensions are possible. These particular dimensions are one example and were chosen to yield an antenna having reasonable signal strength and acceptable resolution for borehole applications. The elements 34 could be off-centered, if desired. The technique of making such an antenna 30 is discussed below concerning FIGS. 7a to 7f.

In another embodiment, the two probe elements 34 are not perpendicular. In fact, the two probe elements 34 can be positioned at an angle relative to one another, in a range of angles which extends from 15 to 90 degrees, for example. The two probe elements 34 could be at any angle relative to one another as long as they are not parallel. Perpendicular probe elements are preferred for balanced electronics, but cannot be manufactured precisely. Thus, after the probe elements are assembled, even if they are substantially perpendicular, one must verify angles of magnetic moment using the formula discussed below concerning FIG. 6. Software could be used to compensate for any discrepancy between an expected angle of magnetic moment and a measured angle.

Figure 4:
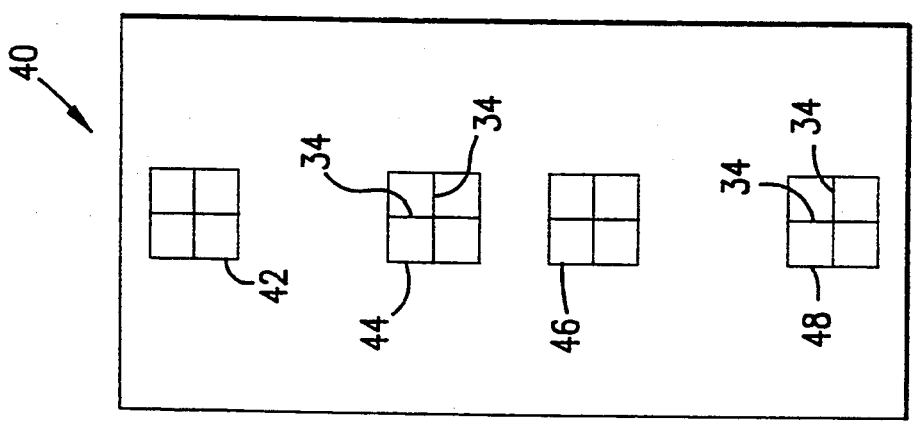
FIG. 4 is a schematic diagram of an array of cross-dipole antennas according to this invention.

FIG. 4 is a schematic diagram of an array 40 of cross-dipole antennas for use on an electromagnetic propagation tool. The antenna array 40 can be electronically switched to produce a vertical magnetic moment like an endfire array, and then a horizontal magnetic moment like a broadside array. The antenna array 40 can also be controlled electronically to adjust an angle of magnetic moment by simultaneously exciting the two elements of the antenna with currents of different amplitude and/or phase.

The array 40 has been tested from 200 to 2000 MHz. The array 40 includes a first transmitter antenna 42 and a first receiver 44 spaced 45 mm from the first transmitter antenna 42. The array also includes a second receiver antenna 46 spaced 60 mm from the first transmitter antenna 42. A second transmitter antenna 48 is spaced symmetrically with respect to the first transmitter antenna 42: 45 mm from the second receiver antenna 46 and 60 mm from the first receiver antenna 44. The second transmitter antenna 48 provides a borehole-compensated measurement in a manner similar to the EPT. The spacings between transmitters and receivers can be varied. This spacing is chosen to determine depth of investigation and vertical resolution.

Figure 5B:
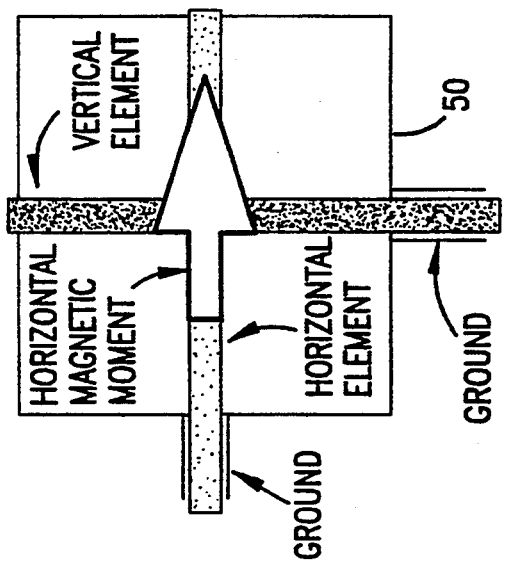
FIGS. 5a–c are schematic diagrams of an antenna according to this invention which generates an adjustable magnetic moment.
Figure 5C:
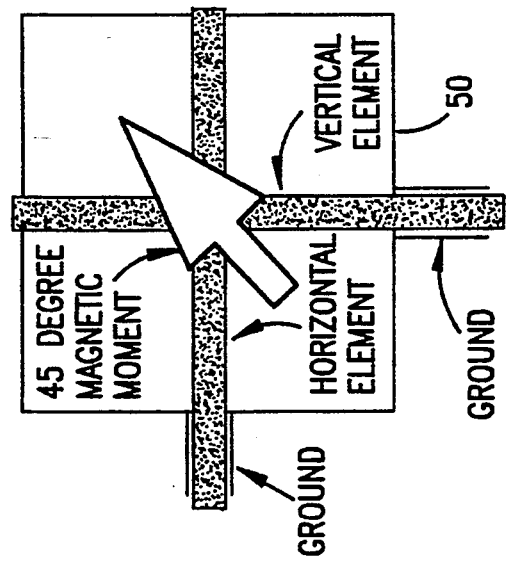
Figure 5A:
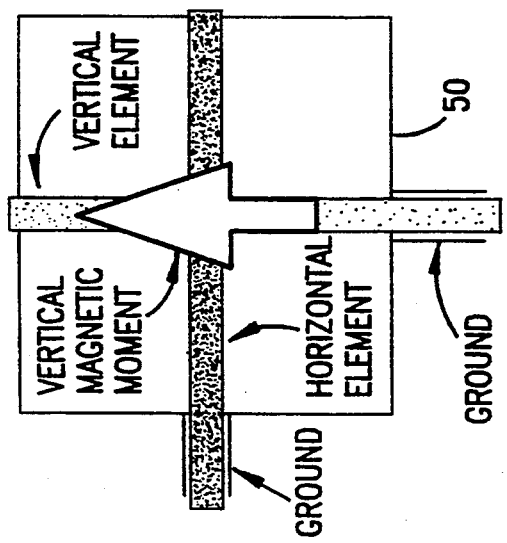

FIGS. 5a–5c are schematic diagrams of the cross-dipole antenna 50 of this invention. In FIG. 5a, only the horizontal element of the antenna 50 has been excited, resulting in a vertical magnetic moment. In FIG. 5b, only the vertical element of the antenna 50 has been excited, resulting in a horizontal magnetic moment. In FIG. 5c, both the horizontal element and the vertical element have been excited by equal signals to those elements, resulting in a 45-degree magnetic moment. Such a magnetic moment is one example of those that are achievable with the cross-dipole antenna of this invention. In fact, the magnetic moment of the antenna is electronically adjustable within the plane of the aperture by adjusting the magnitude and/or phase of the currents of the elements, and includes the case in which the current of one element is zero.

According to this invention, the array of such dipole antennas 50 provides both better standoff performance and sharper imaging. A logging tool having an array of cross-dipole antennas is placed a desired depth in the borehole and the cross-dipole antennas are excited. A circuit, described below, changes the phase and amplitude of signals to the horizontal and vertical elements, to adjust the magnetic moment of the antenna through all angles between and including vertical and horizontal relative to the axis of the borehole. Regardless of the dip angle of the bed being logged, the magnetic moment at one adjustable angle is parallel to the borehole axis, which provides better standoff performance. The magnetic moment at another adjustable angle of the scan is perpendicular to the bed, which provides sharper imaging. This can be done with either hardware or software.

The latter is more flexible and provides a wider range of selectable angles of scan.

The array of dipole antenna as 50 is used to broadcast in an endfire mode and broadside mode either simultaneously or sequentially. To broadcast simultaneously in endfire and broadside modes, the two channels comprising elements 34 of each antenna are excited by slightly different frequencies. For example, the vertical elements of antennas in an array 50 can be excited at 1.03 GHz, and the horizontal elements of those same antennas can be excited simultaneously at 1.00 GHz. These slightly different frequencies are equivalent from a rock physics viewpoint, but allow encoding of the simultaneously broadcast endfire and broadside modes. After the well has been logged, the image data from another logging tool, such as a formation microscanner (FMS, mark of Schlumberger) tool, is processed to reconstruct a response by the antenna array which is parallel and perpendicular to the formation bed. The tool is described in U.S. Pat. No. 4,468,623 for "Method and Apparatus Using Pad Carrying Electrodes for Electrically Investigating a Borehole" to Gianzero et al. and U.S. Pat. No. 4,567,759, for "Method and Apparatus for Producing an Image Log of an Earth Formation Penetrated by a Borehole" to Ekstrom et al., both assigned to the assignee of this invention. The description of the FMS tool in these U.S. patents is incorporated by reference. Alternatively, the two channels can be excited alternately and data acquired during the endfire and broadside modes by multiplexing techniques.

Figure 6:
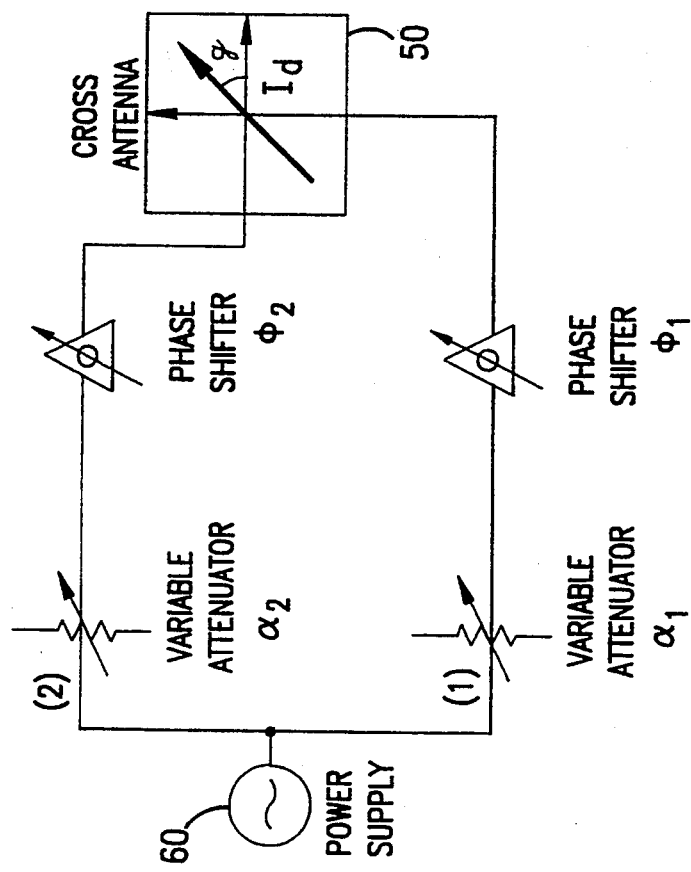
FIG. 6 is a circuit for adjusting the magnetic moment of the cross-dipole antenna.

FIG. 6 is a circuit for adjusting the angle of magnetic moment of the cross-dipole antenna 50 of FIG. 5c. The signal from a signal source 60 is divided equally between the two paths (1) and (2). Thus, the current supplied to each path is denoted by I. Along path (1), the current undergoes an attenuation $a_1$ and a phase shift $f_1$. Along path (2) the current undergoes an independent attenuation $a_2$ and a phase shift $f_2$. Thus, the current fed to the vertical element is $I_1$ given by:

$$I_1 = a_1 I e^{jf_1}$$

and, the current fed to the horizontal element is $I_2$ given by:

$$I_2 = a_2 I e^{jf_2}$$

Thus, the equivalent dipole will be carrying a current $I_d$ and whose axis will be pointing along a direction making an angle q with the horizontal:

$$I_d = I[(a_1)^2 + (a_2)^2]^{\frac{1}{2}}$$

and $$\tan q = (a_1/a_2) e^{j(f_1-f_2)}$$

For the dipole axis to be pointing in the first quadrant as viewed in FIG. 5c, i.e., $0° < q < 90°$, we choose $f_1 = 0°$ and $f_2 = 0°$, to be pointing in the second quadrant, i.e., $90° < q < 180°$, we choose $f_1 = 0°$ and $f_2 = 180°$, to be pointing in the third quadrant, i.e., $180° < q < 270°$, we choose $f_1 = 180°$ and $f_2 = 180°$, and finally, to be pointing in the fourth quadrant, i.e., $270° < q < 360°$, we choose $f_1 = 180°$ and $f_2 = 0°$.

In any of the four quadrants, the current can then be continuously swept, or incrementally stepped, by varying the ratio $a_1/a_2$ from 0 to any arbitrarily large number. Such circuits are known, but have not been used to steer or adjust the magnetic moment of a cross-dipole slot antenna.

For each incremented angle of magnetic moment, a corresponding logged image is produced in the manner described in U.S. Pat. No. 4,704,881, for example. The log produced when the angle of magnetic moment is perpendicular to the bed boundary will yield the sharpest image and when parallel to the borehole axis will provide a better standoff performance. Only these two log images are needed if the dip characteristics of the bed are known.

TECHNIQUE FOR MAKING A CROSS-DIPOLE ANTENNA

Figure 7A:
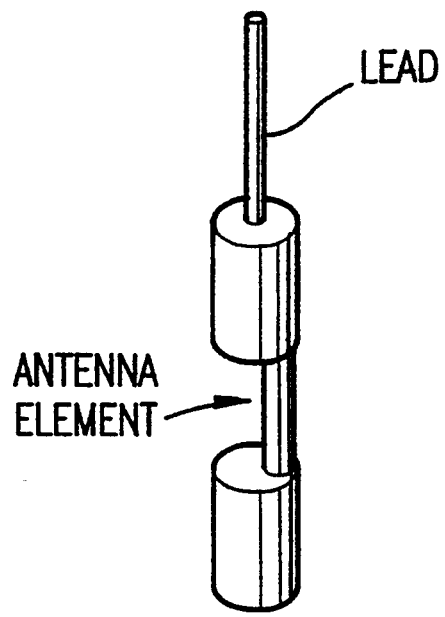
FIGS. 7a–f illustrate a technique of making the slot antenna of FIG. 3.
Figure 7B:
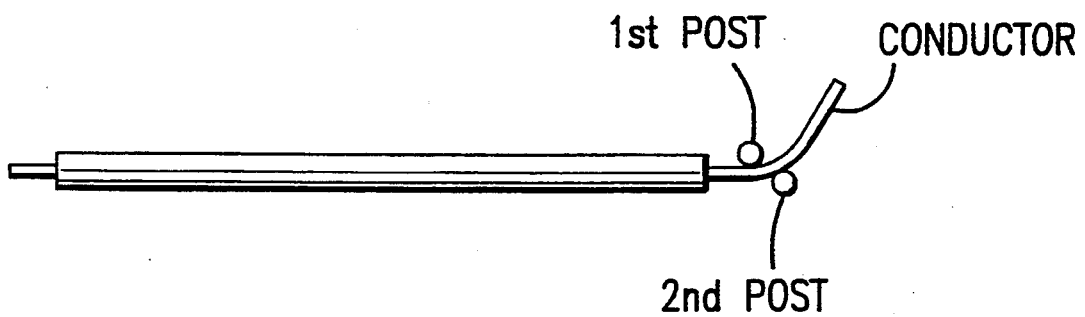

Ultrasonically clean chassis of FIG. 3 and elements of FIG. 7a. Insert the element lead into the antenna element end. This lead is actually the center conductor of Micro-Coax Company's #UT-47 coaxial cable and is made of 0.0113 inch diameter silver plated copper weld. The element is brass, having a diameter of 0.063", a length of 0.3406", and a notch width of 0.075". Apply a small dab of Ersin's SN96 solder paste to the junction between the element and the element lead. Apply heat to the junction using an American Beauty resistance solder tweezer #10541 (power unit set to 70). Clean any droplets of solder off the element. Cut the element lead so that the combined length of the element and the lead is slightly longer than 0.435". Then burnish the lead end so that the total length is 0.435". True the element lead in a precision lathe using a dial indicator to check for trueness. Adjust wobble to be less than ±0.001". Machine the solder joint to have a taper with an overall length of 0.010" using a lathe and cutting tool. Reclean with ethanol.

Fabrication of the slot feed:

Use Micro-Coax's coaxial cable #UT-47 in its straight length form (not coiled). Measure and cut all slot feed lengths identically, 1.00" leaving center conductors long at both ends. Pre-extrude the dielectric of the slot feeds by placing in oven at 100° C. for one hour. Polish the outer conductor with fine steel wool. Strip the dielectric even with the outer conductor at both ends. Cut one end of the center conductor to 0.050" for acceptance into an Omni-Spectra Company's OSMM FM connector. Form an element lead joint loop at the other end by bending the center conductor against a first post and then against a second post. See FIG. 7b. Cut off any excess. Use Ersin's SN to solder slot feed to omni spectra OSMM jack #4002-7947-00. Follow Omni Spectra's assembly procedure instructions to do this task. Check for shorts and opens with an ohm-meter. Make sure slot feeds line up and fit in the channel of the slot antenna housing. Make sure the loop of the slot feed is exactly centered over the element lead channel.

Fabrication of the housing:

With slot feeds and elements removed from antenna housing, tin all surfaces to be soldered using flux and SN60 solder. See 70 of FIG. 7c. Remove flux residue. Do not get solder in holes of the antenna housing at this time. Before soldering crossed dipole elements 72 in place, they must be precisely centered and the cams must be aligned exactly on the center axis of the element. See FIG. 7d. Each element has a locating key hole drilled into it. When the clement holes are aligned with the holes in the antenna housing, and two pieces of 0.0113" diameter copper weld wire are inserted into these "key" holes, and the element cams will be forced into perfect axial alignment. Center the elements and 0.010"thick copper shim material wedged diagonally into the notch spaces of the right angled placed elements to complete the precise placement of the elements. Flux and use SN60 solder to solder the elements in place. Carefully remove the copper weld locating key pins while the solder is still liquid (do not disturb elements during this procedure). Fill the key holes with solder. Let cool. Remove the shims and the element centralizer locating tools. Clean thoroughly, and inspect the element placement using a microscope.

Figure 7C:
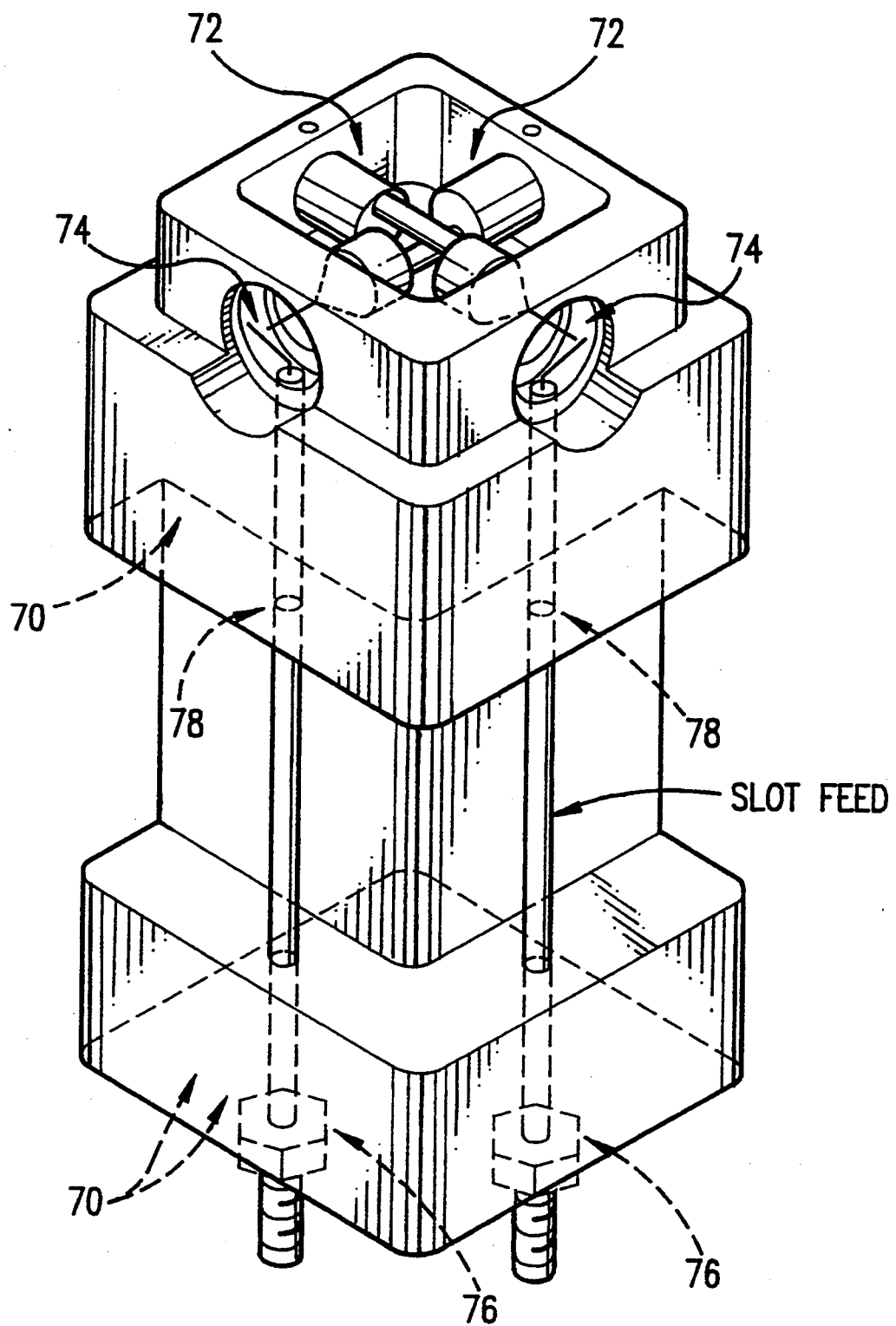
Figure 7D:
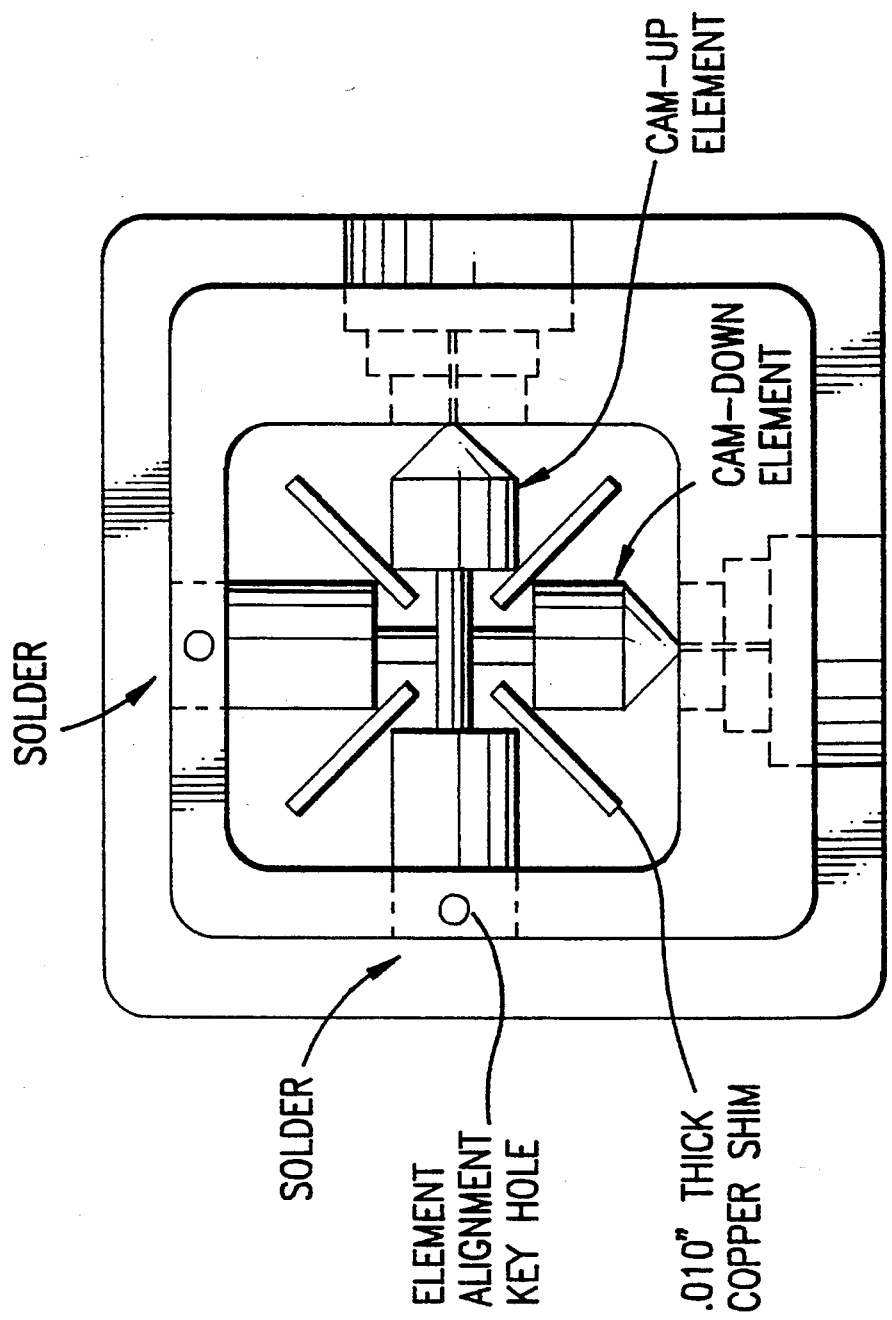
Figure 7E:
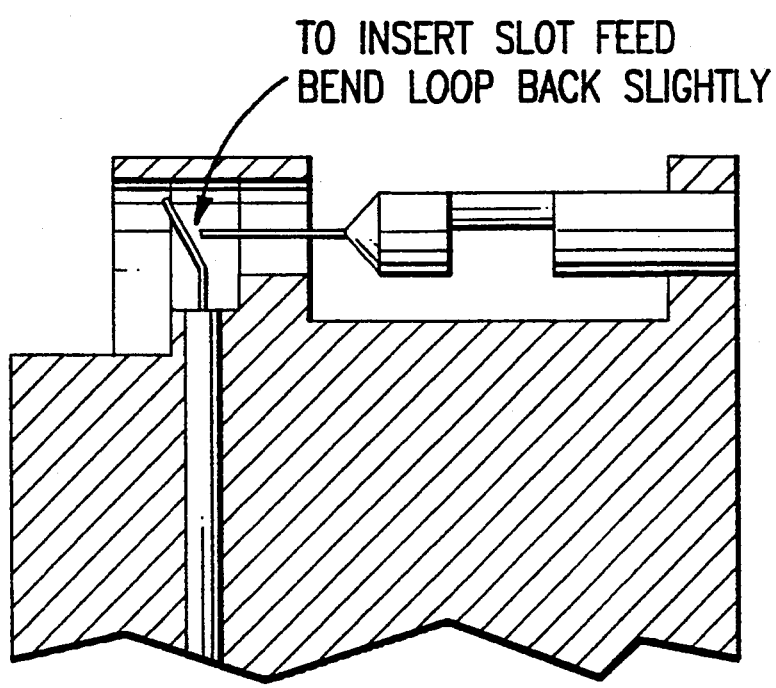
Figure 7F:
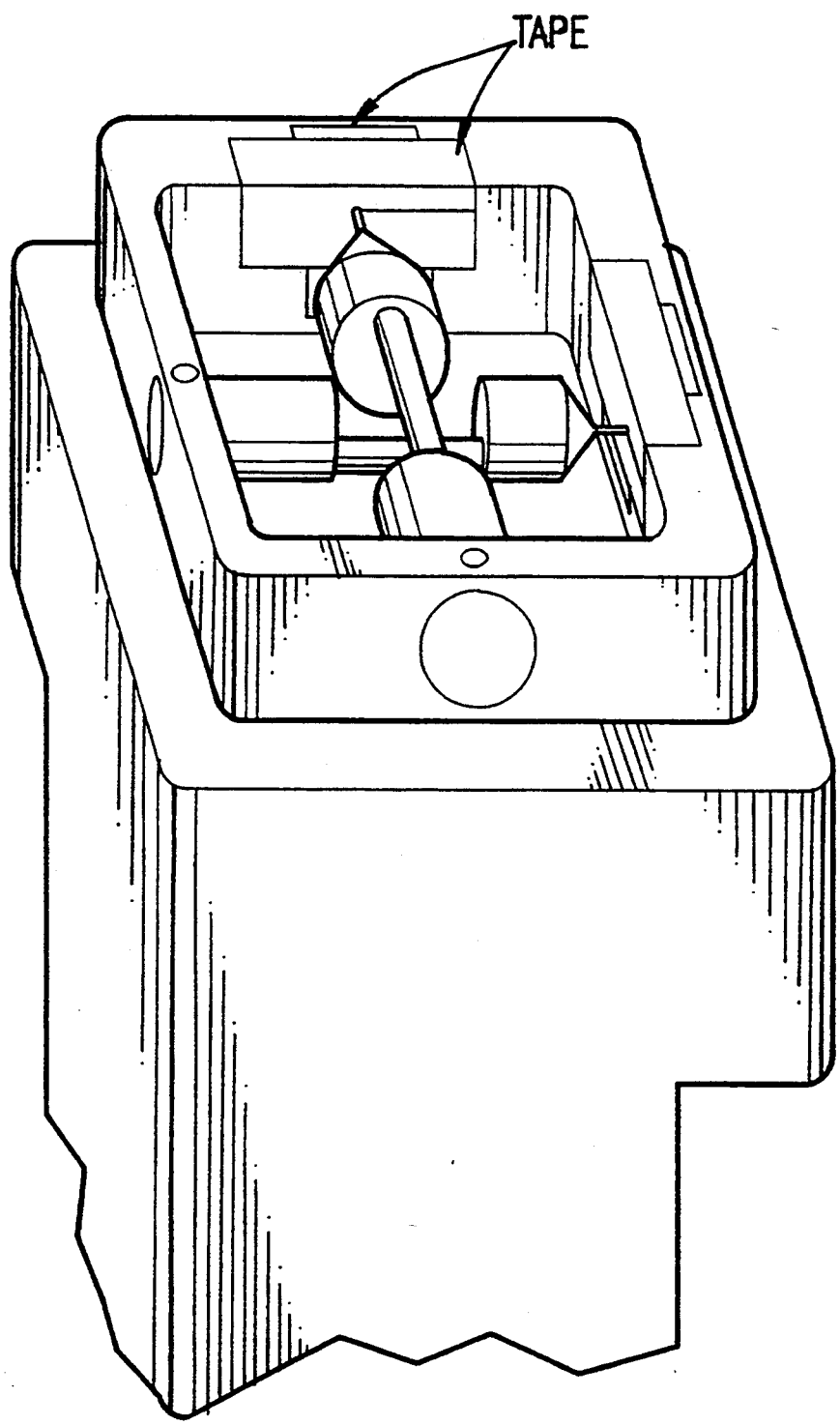

With the slot feed loop bent slightly outward (so that it will not hit the element lead when inserting) see 74 of FIG. 7c and FIG. 7e, insert the slot feed. Bend the loop over the element lead. Inspect positioning of the loop. It must fall directly over the element lead and not pull or push the lead off center. Heat sink the element using a "Hunter" heat sink clip. With the aid of the microscope, apply a very small drop of SN60 solder paste on the element lead joint. Touch with a Weller EC4000 soldering iron tip. When the joint is made, it should be smooth, round and with no excess solder. Clean and inspect.

Securing the slot feed to the antenna housing at its base:

Flux the area to be soldered. Check position of element See 76 of FIG. 7c lead joint. Make sure it has not shifted off center. Heat sink the slot feed with SN60. Solder the area where the OSMM connector contacts the pretinned surface (first step of the slot antenna housing). The joint should look like a smooth bead of solder around the circumference of the connector and should be water tight. Be careful not to overheat or the OSMM-to-UT-47 joint will be damaged. Clean and inspect. Flux the area to be soldered at 78. Heat sink the slot feed. Solder area around the coaxial cable. Do not overheat. Clean and inspect the joint. There should be a smooth bead of solder around lead and it should be water tight.

Pre Antenna Lead Element Lead Inspection:

Inspect the area of the element lead joint very carefully. Make sure the joint is centered and that there are no droplets of solder in the element lead channel or in the element lead joint well. If the dielectric of the slot teed coax has extruded and is putting pressure on the element lead joint, it should be cut away slightly. Check the electrical properties of the antennas by measuring its reflection coefficient and impedance. Before potting, it is essential that the slot and lead joint well areas be perfectly clean and free from all flux residue, solder specks, dust etc. Use flux remover and ethyl alcohol to clean.

Potting:

To pot antenna lead-element "lead joint well", make a tape dam to dam off the lead joint well so that it may be potted and no epoxy will flow into the slot cavity. First, straddle the element lead with sliced Teflon tape formed like a "Y". To do this, place the tape flaps around element lead, then seal with another piece of tape. See FIG. 7f. Use Emerson and Cuming STY-CAST 2058 epoxy casting resin following their procedures outlined in their bulletin 7-2-418. Mix 12 grams of part "A" to 1 gram part "B" in the standard way. Be sure to evacuate air from the mixture. The pour is done in 3 continuous steps to avoid trapping air. Warm the slot antenna housing slightly. Do not exceed pot life of the epoxy. Step 1: start by pouring a drop of epoxy against the inner top surface of the lead channel. Let this epoxy settle to the bottom, forcing air out the bottom and along the inner bottom surface of the channel. Step 2: continue by pouring a drop or two of epoxy in the same manner. Step 3: when this has settled, finish by filling "lead joint well" completely. When potting is complete, there should be a convex surface over the lead joint well. This will allow for shrinkage after curing. Let cure. The convex surface will later be milled so that the upper hatch plug will fit correctly. Remove the teflon tape dam. Clean the area of the teflon tape dam making sure that them is no residual mastic left from the tape and inspect.

Potting Slot Cavity:

Warm the slot antenna housing. Do not exceed the pot life of the epoxy or the epoxy will not flow freely and penetrate integral parts of the cavity. Start by pouring very small amounts of epoxy along the edge of the cavity and let the epoxy settle along the bottom of the cavity. Do not force the epoxy to flow. Agitating or probing might cause air to become trapped under epoxy. Continue pouring epoxy on top of the settled pour. Finish by pouring epoxy on top of previous pourings leaving a convex crown on top of the slot. This will allow for shrinkage. Let cure. After potting has cured, excessive potting will be removed by refacing the surface.

Installation of Lead Joint Well Hatch Plug:

Install an upper hatch plug by first coating the inner surfaces of the plug with Eccoshield SX silver caulking compound and then inserting the plug into element lead joint access hole. Press the plug tightly into the hole so that it is flush. Let cure. Clean off any excess silver caulk. This finishes the antenna.

Comparison of Dipole Array and Cross-Dipole Array

Figure 8A:
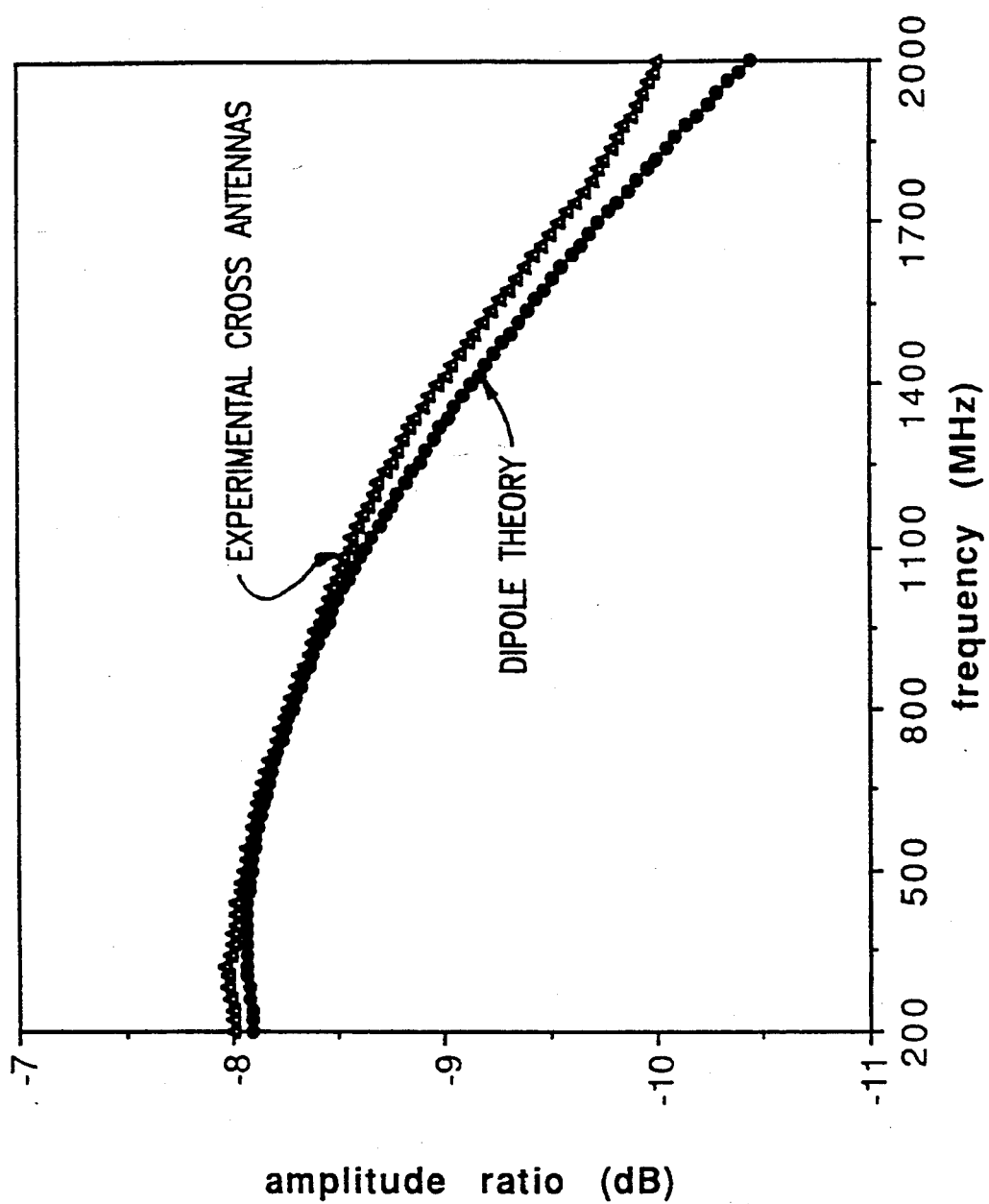
FIGS. 8a–9b illustrate a comparison of dipole arrays to cross-dipole arrays.
Figure 8B:
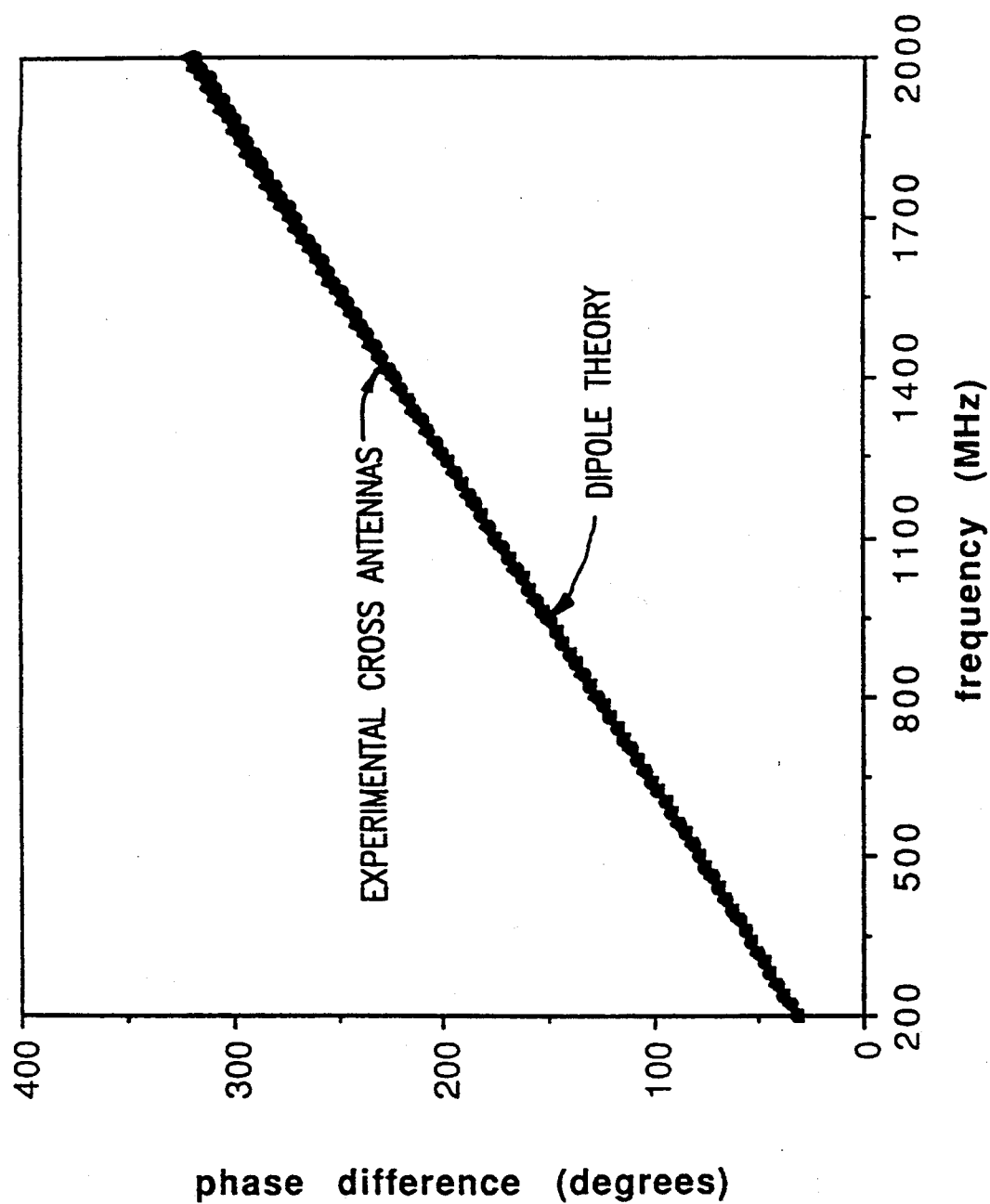

FIGS. 8a to 9b illustrate a very close correlation between the response of a dipole model of an endfire array and the response of an array of cross-dipole antennas in 1 ohm.m of water. The dipole model and the cross-dipole antennas are compared to establish whether or not response of the cross-dipole antennas is affected by cross coupling between perpendicular antenna elements. Spacing between a transmitter of the endfire array and a receiver in a first location was 45 mm, and spacing between that transmitter and the receiver in a second location was 60 mm. FIG. 8a shows amplitude ratio in dB, and FIG. 8b shows phase difference in degrees, as a function of frequency in MHz.

Figure 9A:
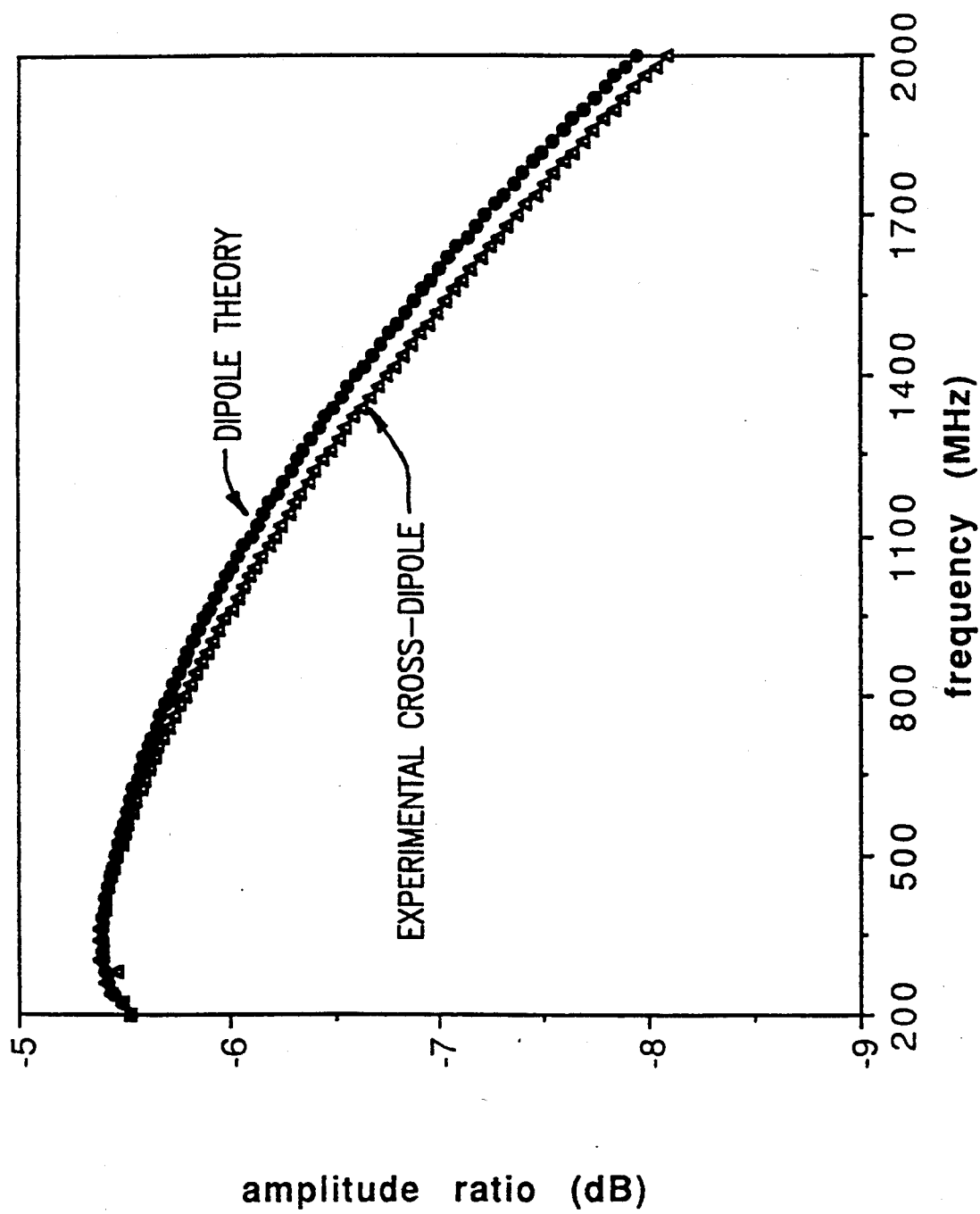
Figure 9B:
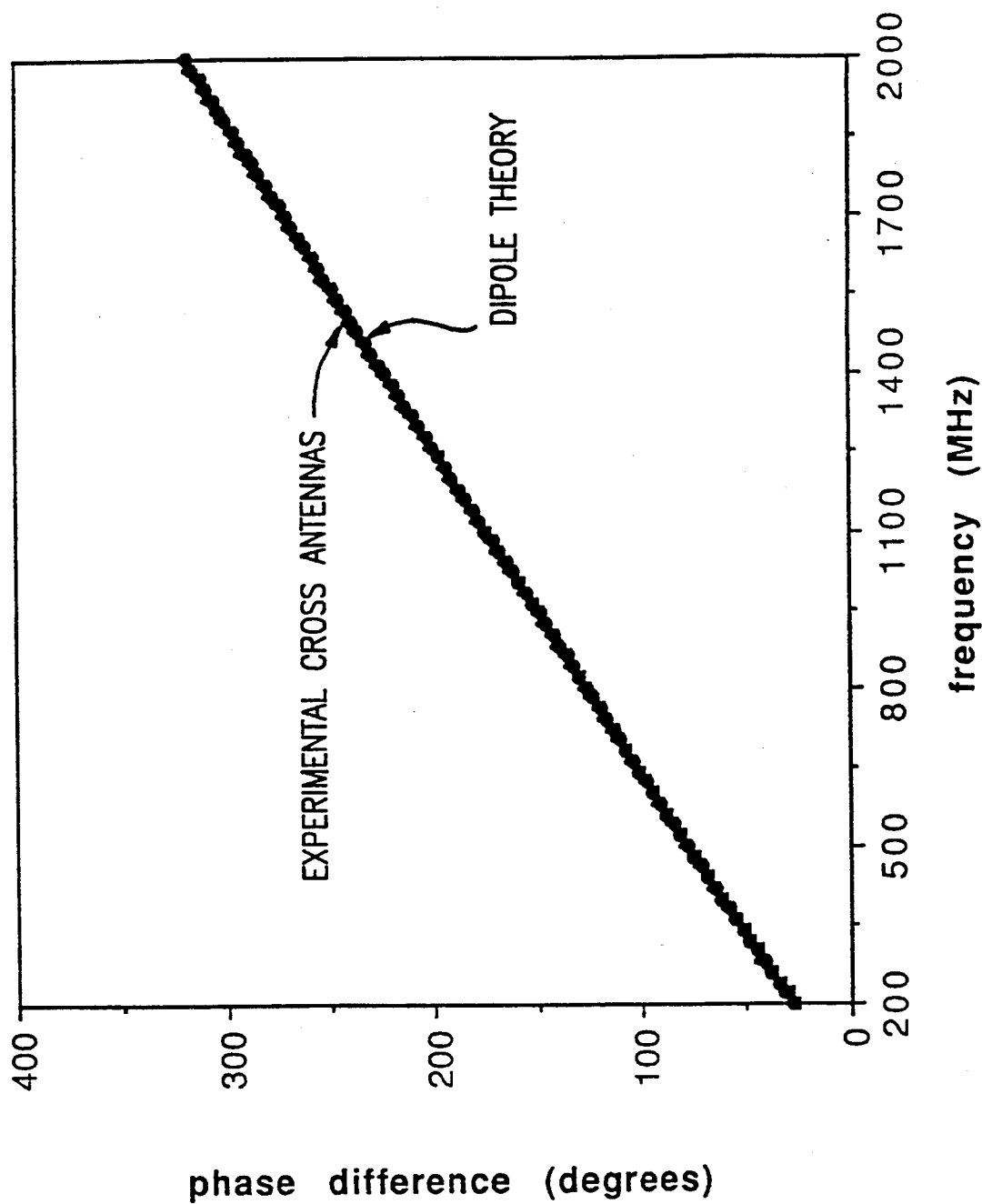

Each experimental antenna has two perpendicular elements, however, only one of the two perpendicular elements has been energized so that the array simulates an endfire array. FIGS. 9a to 9b illustrate the homogeneous medium response of a broadside array, which has been arranged under the same constraints as the endfire array, described above. Again, only one of the two perpendicular elements has been excited.

For each of the FIGS. 8a–9b, the curve of solid symbols represents the calculated response of the dipole model. The curve of hollow symbols represents the response of the experimental antennas. The figures clearly show that the response of the experimental antennas, each having one energized element and another unenergized perpendicular element, very closely tracks the response of the dipole model having single element antennas. It is evident from this comparison that any cross coupling between the energized element and the unenergized perpendicular element has a negligible effect on the response of an endfire array that comprises antennas having two such elements.

Scans of the Formation With Cross-dipole Arrays

FIGS. 10a to 13b show a comparison of actual boundaries of a bed to detected boundaries of the bed. The array comprises antennas having two perpendicular probe elements according to this invention. The figures illustrate the results of array scans of a 2-inch bed formation sandwiched between thick water beds at 1.0 GHz. Permittivity of the thick water beds is 74 and conductivity is 4.2 mho/m. Permittivity of the formation bed is 22 and conductivity is 0.9 mho/m. The spacing between a transmitter and a first receiver is 45 mm, and spacing between that same transmitter and a second receiver is 60 mm. FIGS. 10a, 11a, 12a, and 13a illustrate in distance in inches. FIGS. 10b, 11b, 12b, and 13b illustrate inverted conductivity in mho/m as a function of scan distance in inches. In these figures, a solid line indicates the actual delineation of a bed boundary, while the points connected by a curve represents an approximation of the bed boundary based on detected permittivity or conductivity values. These values are produced as an array is scanned past the bed. The close correlation between the solid line and the curve indicates that the antenna of this invention readily identifies bed boundaries of a formation independent of any cross coupling that might occur between the two elements.

Figure 10A:
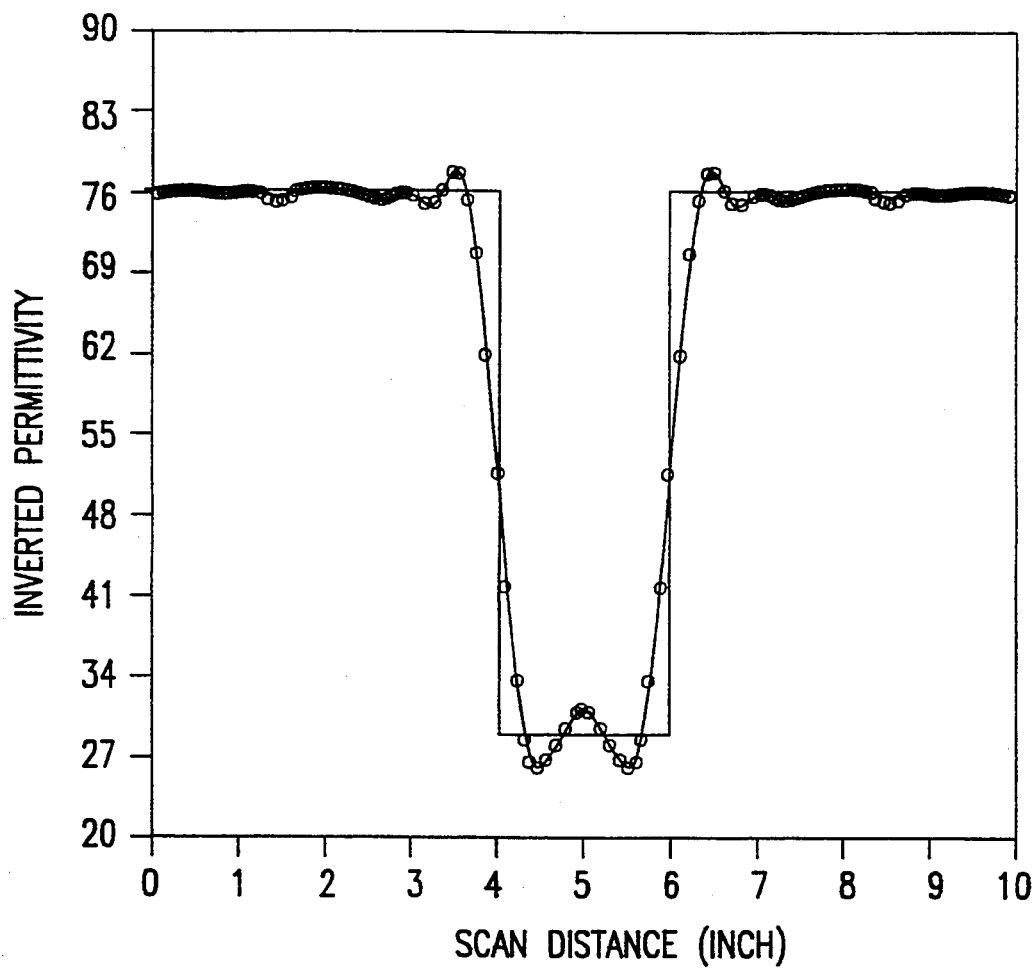
FIGS. 10a–13b compare actual boundaries to detected boundaries of a bed.
Figure 10B:
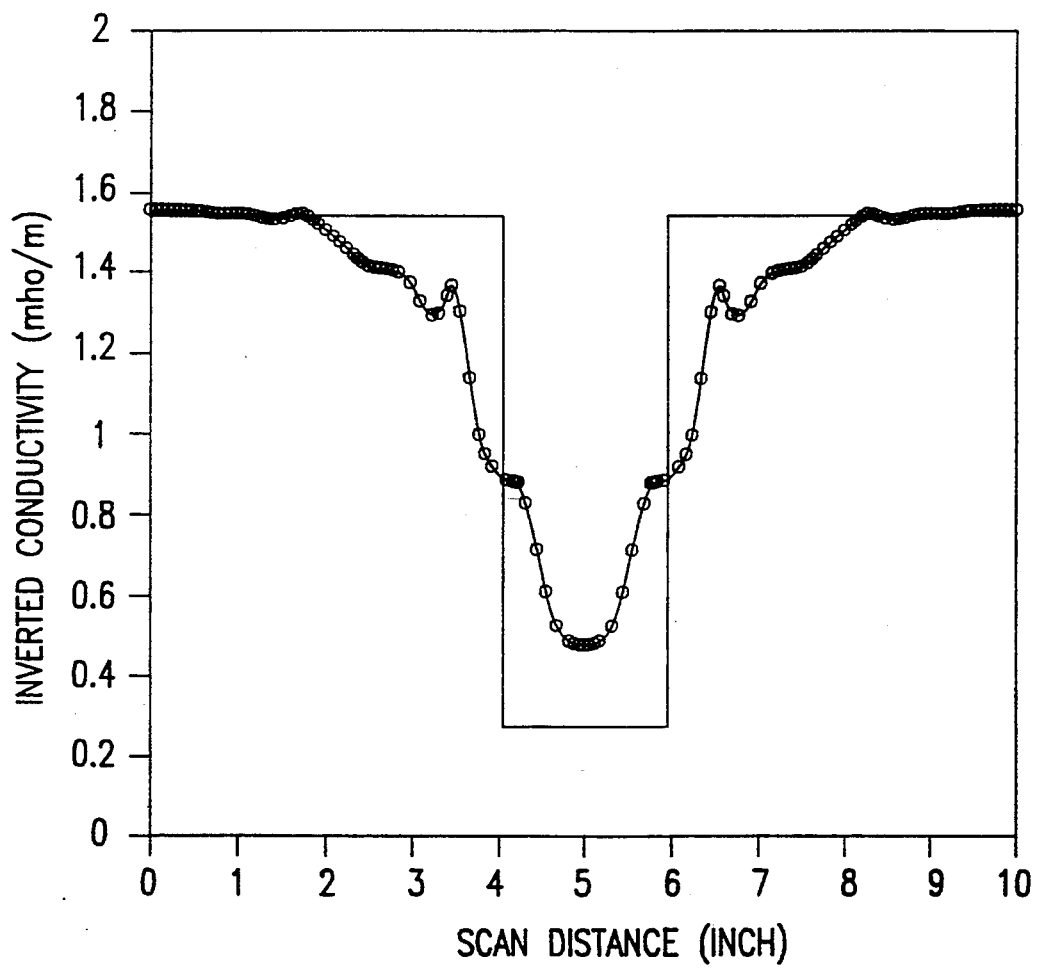
Figure 11A:
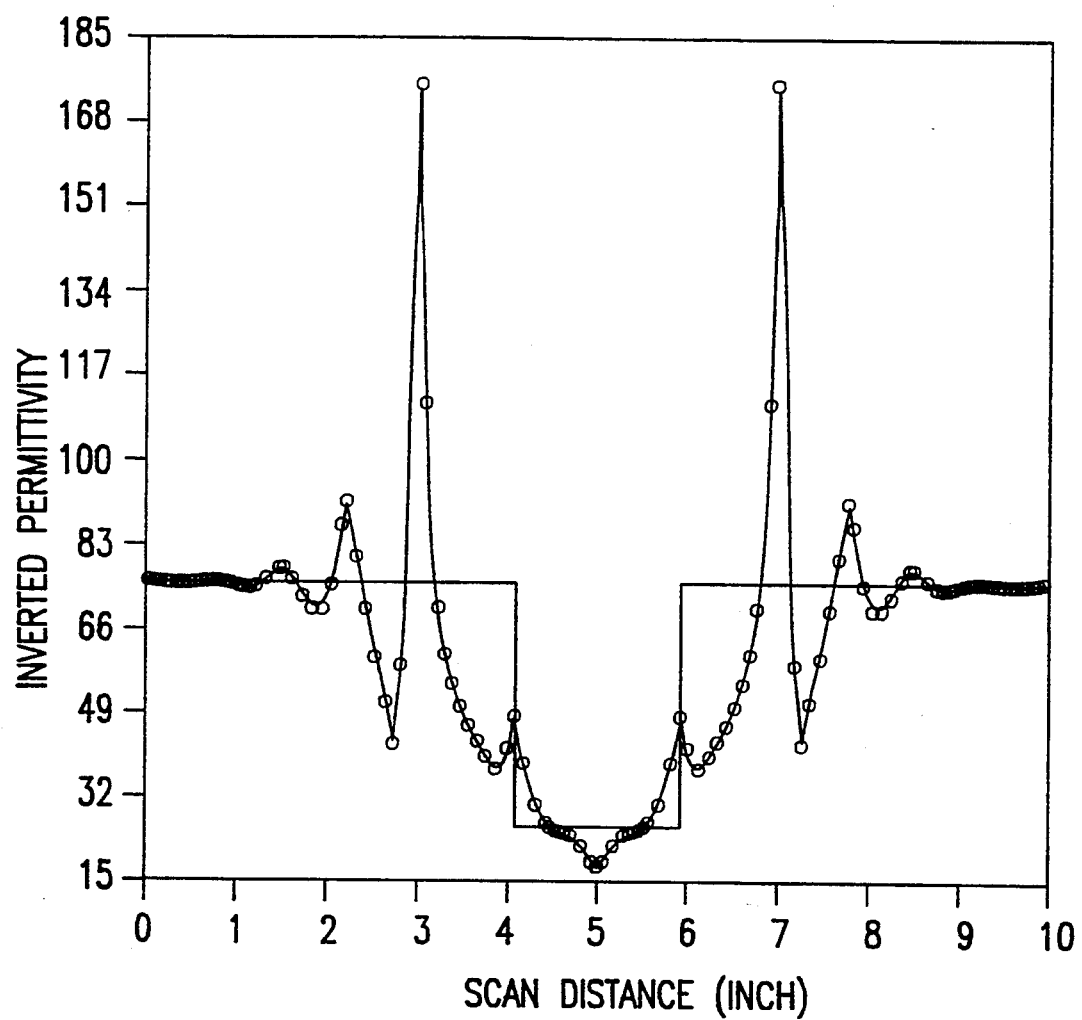
Figure 11B:
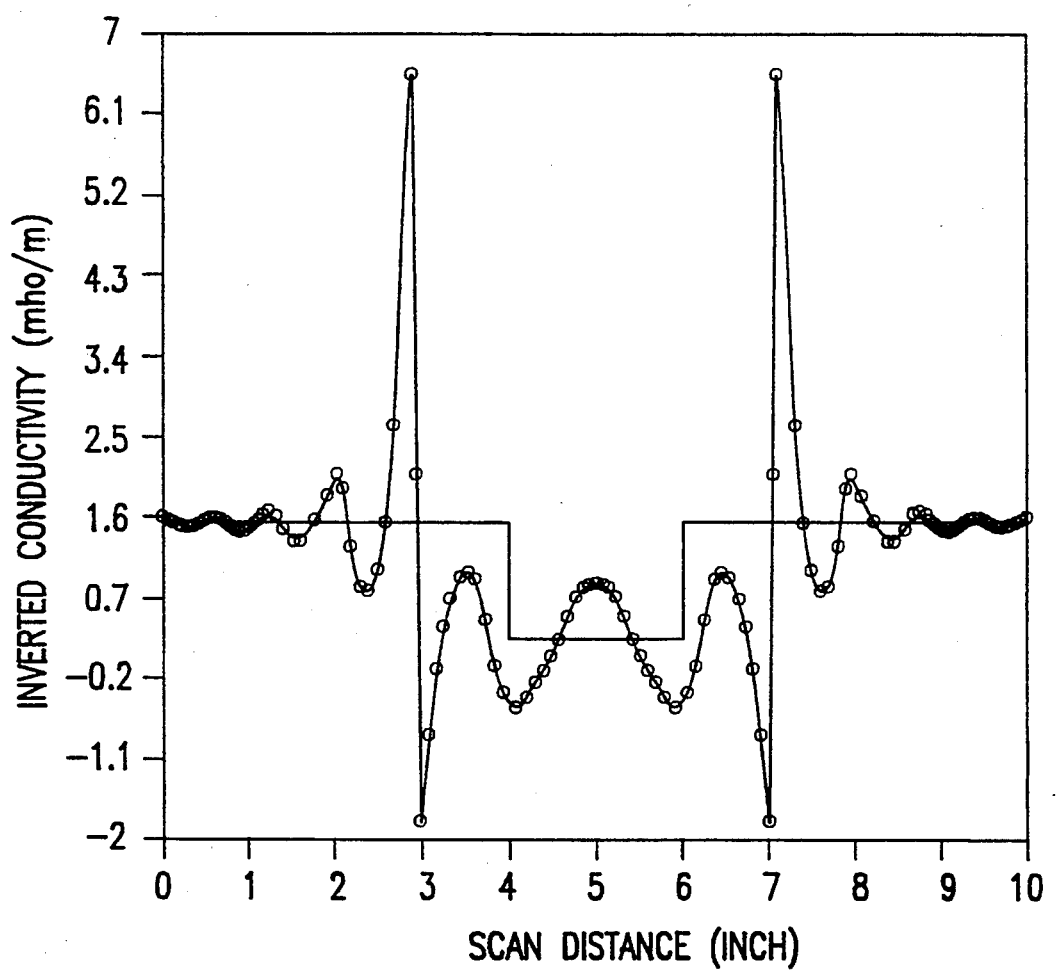

Specifically, FIGS. 10a to 10b illustrate the results of a scan of an endfire array when the axis of the array is perpendicular to the bed formation (a "vertical" scan) and FIGS. 11a to 11b illustrate the results of a scan of an endfire array when the axis of the array is parallel to the bed formation (a "horizontal" scan). In these cases, only the horizontal element of each antenna is energized by a current and the antenna produces a magnetic moment having only a vertical component.

Figure 12A:
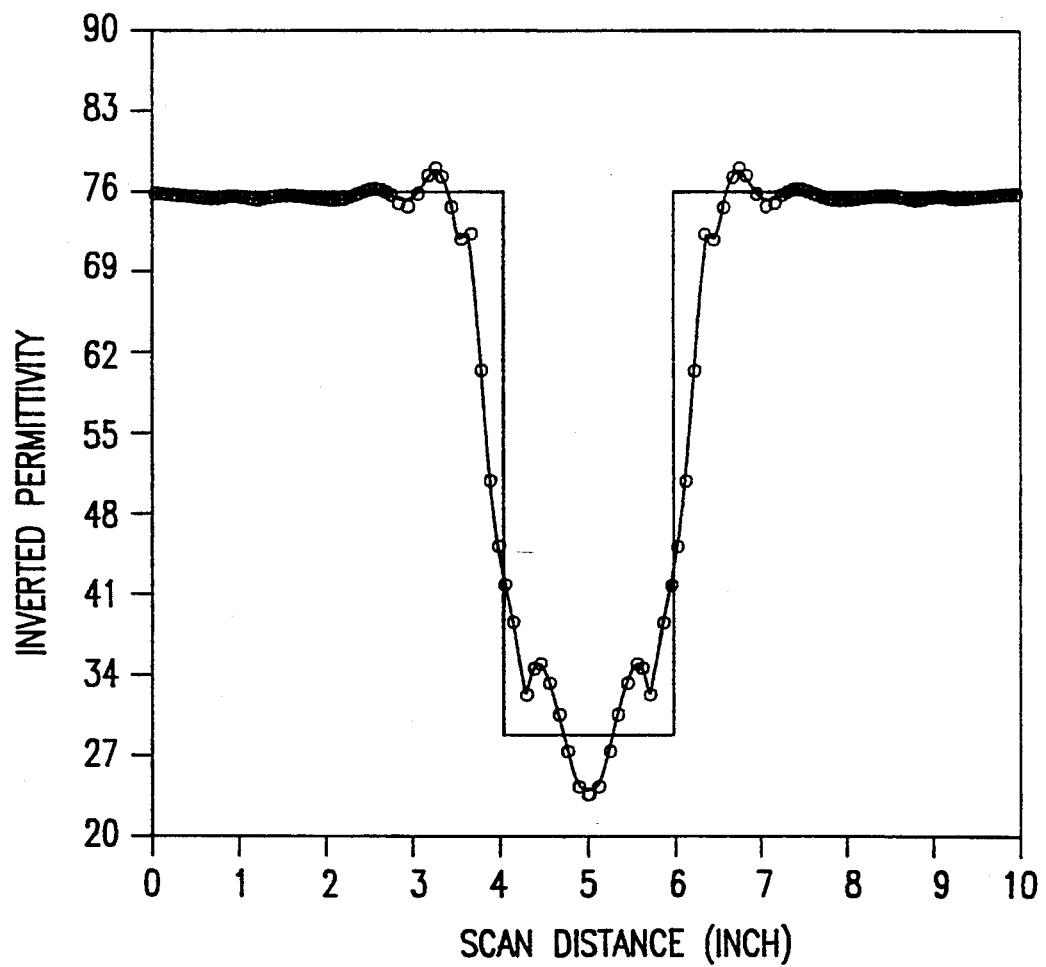
Figure 12B:
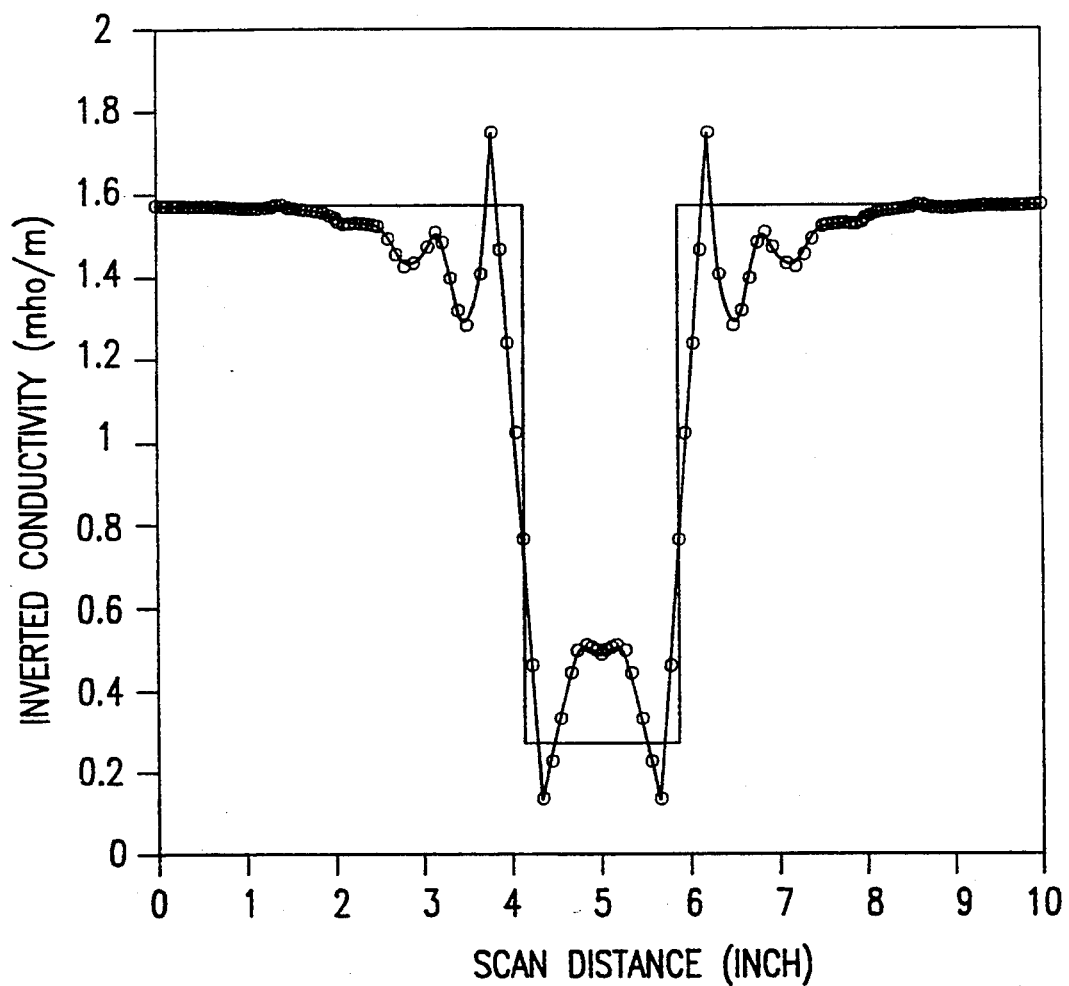
Figure 13A:
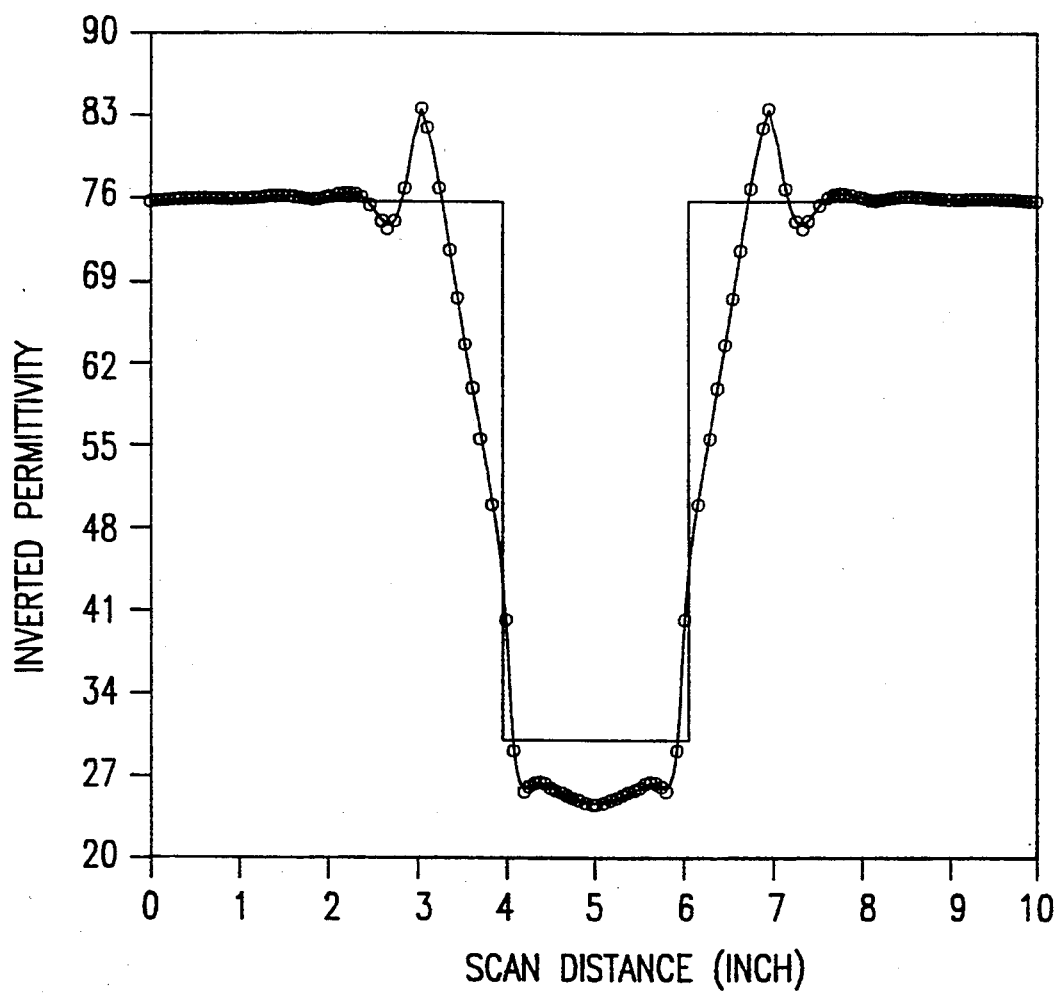
Figure 13B:
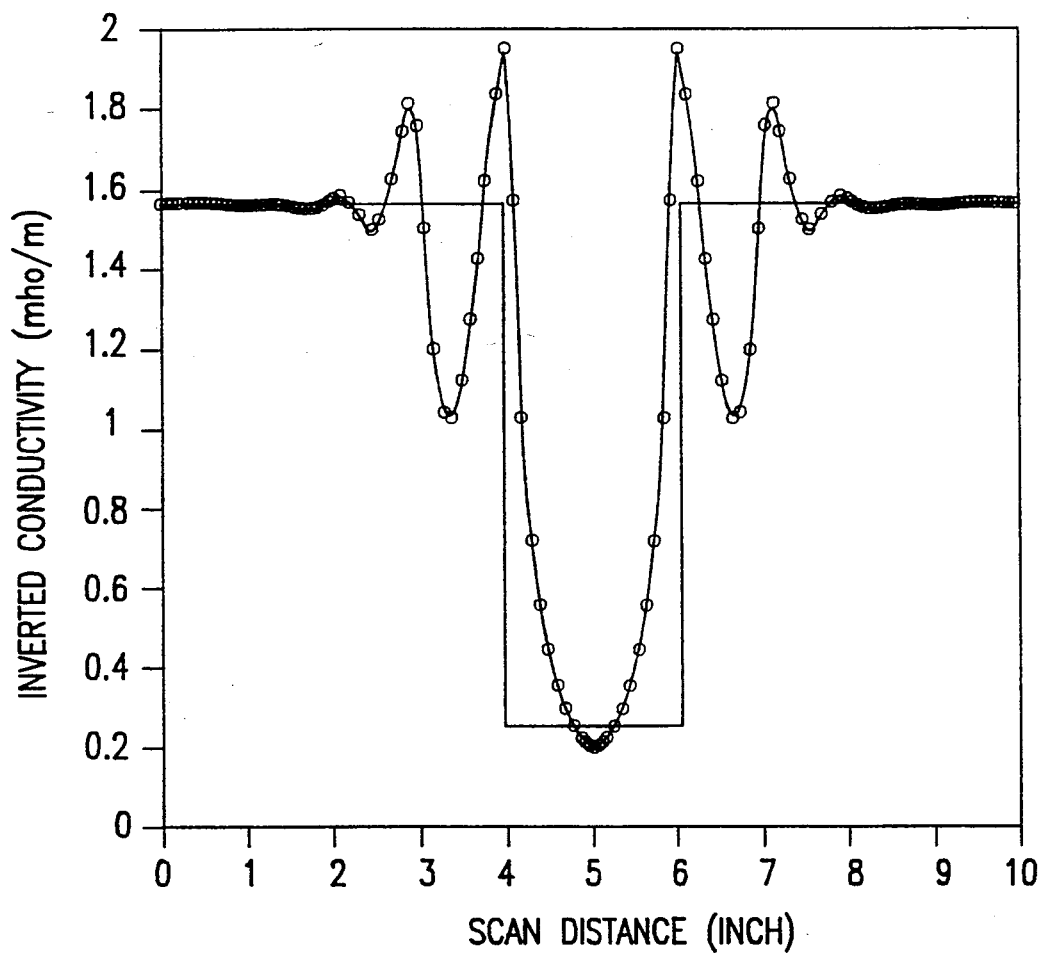

FIGS. 12a to 12b illustrate results of a vertical scan of a broadside array and FIGS. 13a to 13b illustrate results of a horizontal scan of a broadside array. In these cases, only the vertical element of each antenna is energized by a current and the antenna produces a magnetic moment having only a horizontal component.

The scanning techniques described concerning FIGS. 10a, 10b, 12a, 12b and FIGS. 13a and 13b are the most capable techniques of identifying a formation bed, as the close correlation between the calculated values, the solid line, and the measured values, curve, illustrate. A horizontal scan of an endfire array by its very nature is the least capable technique of identifying a formation bed, as the difference between the calculated values, the solid line, and the measured values, curve, of these FIGS. 11a and 11b illustrate. From these figures, it is therefore shown that the sharpest image is obtained when either the array axis (the line passing through the centers of the antenna elements) or the element axis (the magnetic moment) is perpendicular to the bed boundaries.

The inventors have demonstrated the performance of an antenna having a square aperture. The conclusions can be generalized to include an antenna having rectangular, elliptical, or circular apertures, for example.

We claim:

1. A method of evaluating a geological formation using a logging tool comprising an array including transmitting means comprising a slot antenna having first and second non-parallel probe elements in an aperture plane, and receiving means, the method including the steps of:

a) transmitting, with the transmitting means, a first electromagnetic wave into a formation to be logged by applying a first electrical signal of a first frequency to the first probe element, the first electromagnetic wave having a corresponding magnetic moment at a first angle relative to the first probe element at the aperture plane, b) receiving, with the receiving means, the first electromagnetic wave after the first electromagnetic wave has propagated through the formation and generating a first signal therefrom, c) simultaneously with transmission of the first electromagnetic wave, transmitting with the transmitting means a second electromagnetic wave into the formation to be logged by applying a second electrical signal of a second frequency to the second probe element, the second electromagnetic wave having a corresponding magnetic moment at a second angle relative to the first probe element at the aperture plane, d) receiving with the receiving means the second electromagnetic wave from the transmitting means after the second electromagnetic wave has propagated through the formation, and generating a second signal therefrom; and e) using the first and second signals to evaluate the geological formation.

2. The method of claim 1, including placing a logging tool within a borehole in the geological formation, wherein:

transmitting the first electromagnetic wave at the magnetic moment of the first angle into the formation to the receiving means occurs at one position along the borehole, and transmitting the second electromagnetic wave at the magnetic moment of the second angle into the formation to the receiving means occurs at the same, one position along the borehole.

3. The method of claim 2, the step of receiving the first and second electromagnetic waves comprises using a slot antenna having two nonparallel probe elements to receive the waves.

4. The method of claim 3, including:

producing a first log image for the one position along the borehole in response to transmission of the first electromagnetic wave to the receiver and in response to the generated first signal, and producing a second log image for the same one position along the borehole in response to transmission of the second electromagnetic wave to the receiver and in response to the generated second signal.

5. The method of evaluating a geological formation using a logging tool comprising an array including a plurality of transmitters and a plurality of receivers, each transmitter comprising a slot antenna having first and second non-parallel probe elements in an aperture plane; including the steps of:

placing the logging tool within a borehole of the geological formation;

applying a first electrical signal of a first frequency to the first probe element at the aperture plane of each transmitter;

applying a second electrical signal of a second frequency to the second probe element at the aperture plane of each transmitter;

transmitting into the formation with the plurality of transmitters first electromagnetic waves from the first probe element in response to the first electrical signal, each wave having a corresponding magnetic moment at a first angle relative to the first probe element at the aperture plane of each transmitter;

transmitting into the formation with the plurality of transmitters second electromagnetic waves from the second probe element in response to the second electrical signal, each wave having a corresponding magnetic moment at a second angle relative to the second probe element at the aperture plane of each transmitter;

receiving with the plurality of receivers the first electromagnetic waves after the first electromagnetic waves pass through the formation and generating first receiver signals from corresponding receivers and also receiving with the plurality of receivers the second electromagnetic waves after the second electromagnetic waves pass through the formation and generating second receiver signals from corresponding receivers; and using the first and second receiver signals to evaluate the geological formation.

6. The method of 5, wherein:

transmitting the first electromagnetic wave at the magnetic moment of the first angle into the formation to the plurality of receivers occurs at one position along the borehole, and transmitting the second electromagnetic wave at the magnetic moment of the second angle into the formation to the plurality of receivers occurs at the same, one position along the borehole.

7. The method of 6, including:

simultaneously transmitting into the formation the first electromagnetic wave and the second electromagnetic wave with the plurality of transmitters.

8. The method of claim 7, wherein the steps of receiving the first and second electromagnetic waves comprise using a plurality of receivers, each receiver comprising a slot antenna having third and fourth nonparallel probe elements in an aperture plane to receive the first and second electromagnetic waves.

9. The method of claim 8, including:

producing a first log image for the one position along the borehole in response to transmission of the first electromagnetic wave to the plurality of receivers and in response to the generated first receiver signals, and producing a second log image for the same one position along the borehole in response to transmission of the second electromagnetic wave to the plurality of receivers and in response to the generated second receiver signals.

10. The method of 9, including:

simultaneously receiving the first electromagnetic wave and the second electromagnetic wave after both waves pass through the formation.

11. A method of evaluating a geological formation using a logging tool comprising an array including at least one transmitter with a first slot antenna having first and second non-parallel probe elements in an aperture plane, a circuit being connected to the first and second probe elements; and at least one receiver; the method including:

placing the logging tool within a borehole in the formation;

applying signals of first and second frequencies to the first and second non-parallel probe elements of the at least one transmitter with the circuit;

simultaneously transmitting from the logging tool first and second electromagnetic waves as a result of respectively applying the signals of first and second frequencies into the formation;

simultaneously receiving with the at least one receiver of the logging tool the first and second electromagnetic waves after both waves pass through the formation and generating at least one receiver signal from the first and second electromagnetic waves; and using the at least one receiver signal to evaluate the geological formation.

12. The method of claim 11, including:

transmitting the first and second electromagnetic waves such that the first and second electromagnetic waves have corresponding magnetic moments of first and second angles relative to the first probe element.

13. The method of claim 12, wherein the at least one receiver for receiving the first and second electromagnetic waves comprises a second slot antenna having third and fourth non-parallel probe elements in an aperture plane.

14. The method of claim 13, wherein transmitting the first and second electromagnetic waves occurs at one position along the borehole, and receiving the first and second electromagnetic waves occurs at the same one position along the borehole.

15. The method of claim 14, wherein transmitting the first and second electromagnetic waves involves transmitting such waves from each of a first plurality of slot antennas on the logging tool.

16. The method of claim 15, wherein receiving the first and second electromagnetic waves involves receiving such waves with each of second plurality of slot antennas on the logging tool.

* * * * *